Sept. 29, 1964     W. KASTEN     3,151,071
FILTER UNIT
Filed May 14, 1962     2 Sheets-Sheet 1
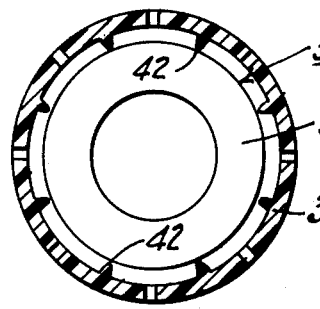
FIG.3
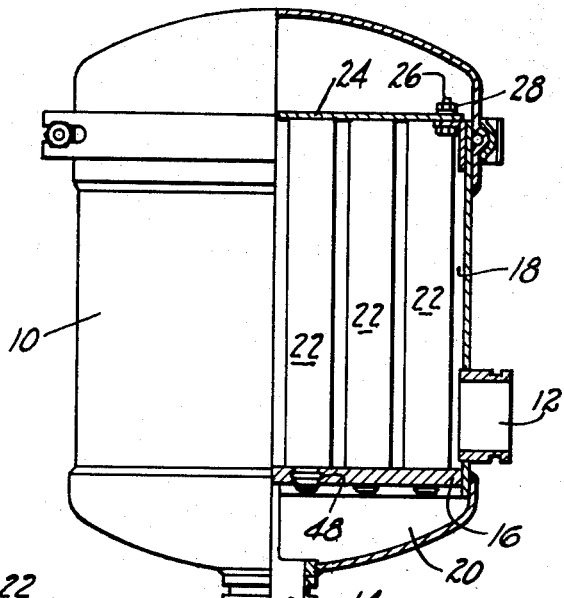
FIG.1
FIG.4
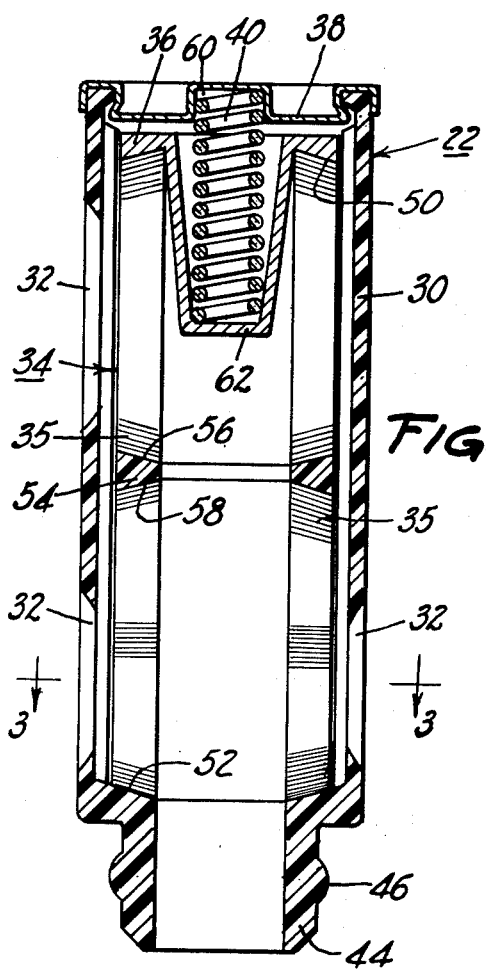
FIG.2
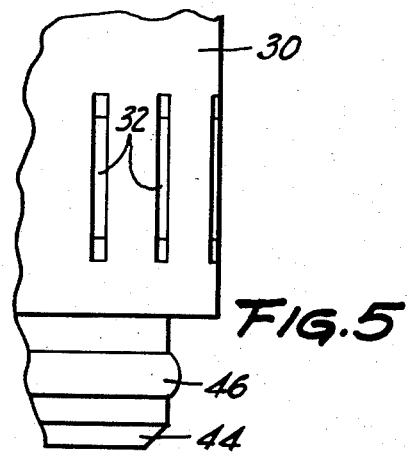
FIG.5
INVENTOR.
WALTER KASTEN
BY
William N. Antonio
ATTORNEY Sept. 29, 1964
W. KASTEN
3,151,071
FILTER UNIT
Filed May 14, 1962
2 Sheets-Sheet 2
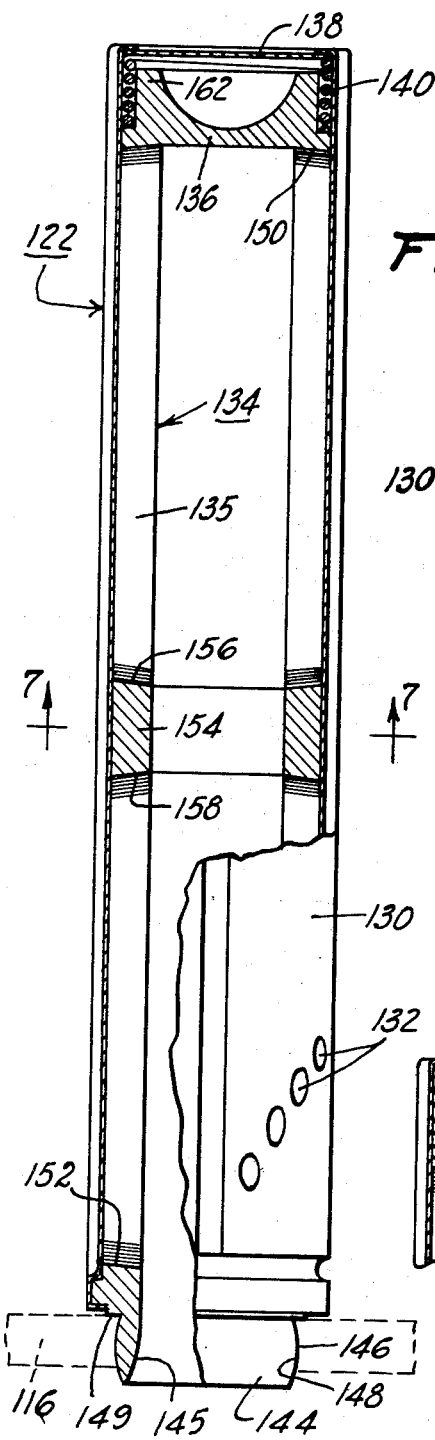
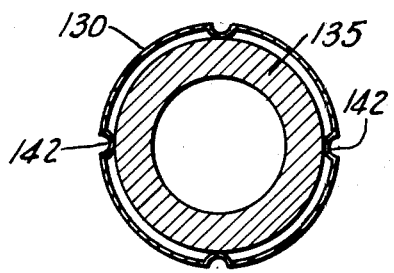
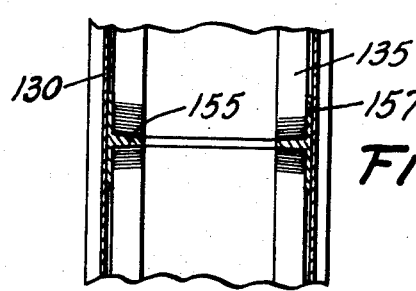
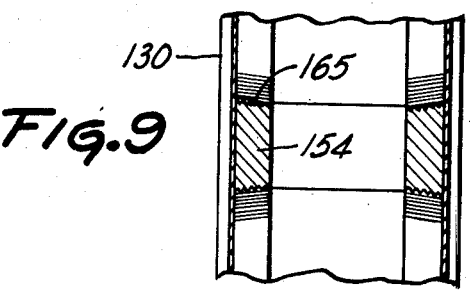
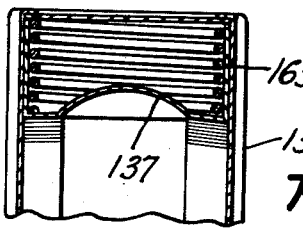
INVENTOR.
WALTER KASTEN
BY
William N. Antonio
ATTORNEY United States Patent Office
3,151,071
Patented Sept. 29, 1964

3,151,071
FILTER UNIT
Walter Kasten, Madison Heights, Mich., assignor to The Bendix Corporation, Madison Heights, Mich., a corporation of Delaware
Filed May 14, 1962, Ser. No. 194,364
12 Claims. (Cl. 210—232)

This invention relates to a filter unit of the type which may be used as a fuel monitoring device and more particularly to improvements in a filter unit which includes a washer-type filter element.

It is an object of this invention to provide, in a filter unit comprising a tubular housing and a washer-type filter element located within said housing, means, such as axially extending ribs, formed on the internal surface of the tubular housing for maintaining the washers of the filter element in proper alignment.

Another object of this invention is to provide a filter unit having a washer-type filter element in which means are incorporated for assuring edge filtration, preventing lodging of solid contaminants between the washers of the filter element, and permitting full use of the differential pressure existing between the outside and inside of the filter element.

More specifically, it is an object of this invention to provide a filter unit of the type described in which the members abutting the ends of the washer-type filter element are formed with conical surfaces arranged to cause the outer edges of the washers to be compressed more tightly than the inner edges of the washers.

Another object of this invention is to provide in filter units of the type described which utilize relatively lengthy washer-type filter elements, collar means located intermediate the ends of the filter element for preventing angular misalignment of the adjacent portions of the filter element and for assisting in causing the outer edges of the washers to be compressed more tightly than the inner edges of the washers.

A further object of this invention is to provide a filter unit of the type described which utilizes an endplate and spring arrangement for directing a substantially perpendicular load against the washers of the filter element.

A still further object of this invention is to provide a filter unit of the type described which includes a nipple-like ferrule composed of an elastomeric material capable of sealing against adjacent surfaces, said ferrule having a throat therein which diverges at its outlet orifice to thereby eliminate turbulent flow therethrough.

The above and other objects and features of this invention will become apparent from the following description taken in connection with the accompanying drawings which form a part of this specification and in which:

FIGURE 1 is a view partially in section showing a plurality of the filter units incorporating my invention;

FIGURE 2 is an enlarged sectional view of one of the filter units incorporating my invention;

FIGURE 3 is a sectional view taken along line 3—3 of FIGURE 2;

FIGURE 4 is a sectional view of a portion of two adjacent washers showing the angular relationship therebetween;

FIGURE 5 is a fragmentary plan view of the filter unit shown in FIGURE 2;

FIGURE 6 is a view partially in section showing another embodiment of one of the filter units incorporating my invention;

FIGURE 7 is a sectional view taken along line 7—7 of FIGURE 6;

FIGURE 8 is a sectional view of an alternate aligning collar;

FIGURE 9 is an enlarged sectional view of a portion of one of the conical surfaces showing somewhat exaggerated serrations formed thereon; and FIGURE 10 is a sectional view of an alternate endplate.

Referring to FIGURE 1 of the drawings, it will be seen that numeral 10 indicates a tank having a fuel inlet port 12 and a fuel outlet port 14. Suitably attached to the housing is a partition 16 which separates the interior of the housing into an inlet chamber 18 and an outlet chamber 20. A plurality of filter units 22 (only three of which are shown) are suitably attached to partition 16 and are retained in position by a retainer plate 24 which is operatively connected to housing 10 by three bolts 26 and nuts 28 (only one of which is shown). The direction of flow through the tank is indicated by the arrows.

Each filter unit 22 includes a tubular housing 30 having a plurality of slotted inlet ports 32, a porous tubular edge-type filter element 34 formed from a plurality of washers 35 in registered face-to-face contact, a movable endplate 36, an endcap 38 fixedly connected to the housing 30 and a spring 40 for placing the edge-type filter element 34 under a suitable calibrated precompression.

The washers 35 may be formed from paper, cellulose, or other suitable fibrous or nonfibrous material and are arranged so that flow through the filter element 34 will be via the radially extending pores formed between the washers. In this particular arrangement flow will be from outside the filter element to inside the filter element.

The housing 30, which is a polyethylene injection molded part, has a plurality of axially extending ribs 42 formed on the internal surface thereof, as shown in FIGURE 3, for centering and maintaining said washers in proper alignment. A nipple-like extension 44 is an integral part of the molded housing and has a bead 46 located on the outer periphery thereof to effect a seal with the opening 48 in partition 16. Such an arrangement provides a satisfactory seal and eliminates the use of an extra O ring-type gasket.

If the filter units 22 are used in connection with a fuel quality testing device of the type disclosed in my application Serial No. 39,101, now Patent No. 3,117,925, it is essential that full use is made of the differential pressure between the outside and the inside of the edge-type filter element 34, often referred to as a "fuse" in this type of a device. In punching the individual washers, prior to assembly, slight burrs are upset at the shear surface, namely at the inside and/or outside diameter of the washers. Oftentimes, these burrs are larger at the inside diameter than at the outside diameter. Whenever this occurs, the washers, after stacking and compression, will form wedge-shaped openings which are larger on the outside diameter. This will not only allow the wedging of particles between the washers, but also will reduce the effect of the differential pressure. Instead of having the full differential pressure acting on the closed end of the washer stack and compressing them, part of the differential pressure will act on the open wedges and nullify this effect. In order to assure that the outer edges of the washers 35 are compressed more tightly than the inner edges thereof so that, as shown in FIGURE 4, the space $S_o$ on the outside of the washer is less than the space $S_i$ on the inside of the washer, the endplate 36 and the nipple-like extension 44 are formed with conical surfaces 50 and 52, respectively, which abut the ends of the edge-type filter element 34. In the case of relatively long stacks of washers, one or more collars 54 are located intermediate the ends of the filter element to assure the desired effect. It will be noted that each of the collars is formed with opposed conical surfaces 56 and 58 which are arranged so that in conjunction with the conical surfaces 50 and 52, it is possible to compress the outer edges of the washers more tightly than the inner edges of the washers. In addition to the compression aspects described, the collars also prevent angular misalignment of the adjacent portions of the filter element 34. In order to direct a substantially perpendicular load against the washer stack forming filter element 34, the spring 40 is centered by the recess 60 in endcap 38 and is prevented from cocking by the elongated extension 62 formed on endplate 36.

In certain filter applications it is desirable to obtain a washer-type filter which will not only trap solid contaminants at the outer edges of the washers, but will also trap such contaminants between adjacent washers. This, in effect, increases not only the dirt loading capacity by virtue of the extra surface area exposed, but also keeps the openings between the washers more constant during the filtration cycle because the filter element will be less effected by and differential pressure acting thereacross. To accomplish this, the slopes of the conical surfaces would be reversed so that the inner edges of the washers would be compressed more tightly than the outer edges.

FIGURES 6 and 7 show an alternate embodiment of one of the filter units incorporating my invention. In these figures like parts are designated by like numbers plus 100. The filter unit 122 includes a metal tubular housing 130 having a plurality of perforated inlet ports 132, a porous tubular edge-type filter element 134 formed from a plurality of washers 134, as previously described, a movable endplate 136, an end closure 138, and a spring 140. The metal wrapper 130 is formed with four axially extending indentations or ribs 142 for maintaining the washers in proper alignment and is operatively connected to a plastic (polyethylene) nipple-like ferrule 144 which has a curved bead-like outer surface 146 for effecting a seal with the opening 148 of a partition 116. It will be noted that not only is a seal on the diameter effected, but that a face-type seal is also provided at 149. It will further be noted that the throat 145 of the ferrule diverges at its outlet orifice so that turbulent flow (sometimes referred to as eddy flow) therethrough will be eliminated. By providing such a diverging orifice which eliminates the eddy currents tending to choke off flow, flow through the outlet orifice is increased and the pressure drop therethrough is reduced.

It will also be noted in FIGURE 6 that the collar 154, which has conical surfaces 156 and 158 formed thereon, also has an axial length which is greater than the difference between the external and internal diameters of the washers 135. This increased axial length, which provides an adequate bearing surface and prevents the collar from cocking, assures that the collars will perform the function intended, namely to prevent angular misalignment of the washer sections and in conjunction with the conical surface 150 formed on the endplate 136 and the conical surface 152 formed on the ferrule 144 to cause the outer edges of the washers to be compressed more tightly than the inner edges thereof. Although the slope of the conical surfaces in the various figures of the drawings have been exaggerated, it has been found that a conical surface forming an angle of between two and three degrees with respect to a plane perpendicular to the axis of the filter element will be most effective. If a greater angle is used the collapse strength of the device is reduced.

Since the structure of collars 154 will tend to increase the length of the filter element, if space is important and a shorter length element is desirable, the aligning collar 155, shown in FIGURE 8, may be used. This collar has an axial length which is less than the difference between the external and internal diameters of the washers but includes an annular flange 157 extending therefrom to provide an adequate bearing surface and prevent cocking.

In order to direct a substantially perpendicular load against the washer stack, the endplate 136 of FIGURE 6 is formed so that the elongated extension 162 is located within the coil spring 140 to prevent cocking of the spring and the endplate itself. FIGURE 10 shows an alternate endplate 137 for accomplishing the same purpose by utilizing a skirt-type elongated extension 163 which surrounds the coil spring.

It has also been found that the efficiency of the device may be improved by providing saw toothed-shaped grooves or serrations 165, as shown in FIGURE 9, on the various conical surfaces previously described. These grooves or serrations which may be concentric or of a spiral nature, prevent leakage thereacross and through means of an improved grip on the adjacent washers can perform the functions previously described in a more efficient manner.

Those acquainted with this art will readily understand that the invention herein set forth is not necessarily limited and restricted to the precise and exact details presented and that various changes and modifications may be resorted to without departing from the spirit of my invention. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. A filter unit comprising a tube having a plurality of ports therein, a plurality of washer-like elements in registered face-to-face contact located within said tube to form a tubular member having radially extending pores between said washer-like elements for permitting flow of fluid therethrough from outside said tubular member to inside said tubular member, means formed on and extending along the full length of the internal surface of said tube for maintaining all of said washer-like elements in proper alignment, nipple-like means located at one end of said tube and having a conical surface formed thereon in abutment with one end of said tubular member, retaining means located at the other end of said tube, movable endplate means located within said tube and having a conical surface formed thereon in abutment with the other end of said tubular member, said conical surfaces of said nipple-like means and endplate means being arranged to cause the outer edges of said washer-like elements to be compressed more tightly than the inner edges thereof, and resilient means confined within said tube between said retaining means and said endplate means for urging said endplate means against said tubular member.

2. A filter unit as defined in claim 1 which includes at least one collar located intermediate the ends of the tubular member, said collar having opposed conical surfaces in contact with the adjacent washer-like elements for preventing angular misalignment of the adjacent portions of said tubular member and in conjunction with the conical surfaces of the nipple-like means and endplate means for causing the outer edges of said washer-like elements to be compressed more tightly than the inner edges thereof.

3. A filter unit as defined in claim 1 wherein said means formed on the internal surface of said tube for maintaining said washer-like elements in proper alignment comprises a plurality of axially extending centering ribs.

4. A filter unit as defined in claim 2 wherein the conical surfaces of the collar, nipple-like means, and endplate means have ridges formed thereon.

5. A filter unit as defined in claim 2 wherein the conical surfaces of the collar, nipple-like means, and endplate means form an angle of between two and three degrees with respect to a plane perpendicular to the axis of the tubular member.

6. A filter unit as defined in claim 1 wherein said resilient means comprises a coil spring and said endplate means includes elongated means for preventing cocking of said spring and for directing a substantially perpendicular load against the tubular member.

7. A filter unit as defined in claim 2 wherein the axial length of said collar is greater than the difference between the external and internal diameters of the washer-like elements to provide an adequate bearing surface and prevent cocking.

8. A filter unit as defined in claim 2 wherein said collar has an axial length which is less than the difference between the external and internal diameters of the washer-like elements and includes an annular flange extending therefrom to provide an adequate bearing surface and prevent cocking.

9. A filter unit as defined in claim 1 wherein the nipple-like means is composed of an elastomeric material and has sealing means formed on the outer surface thereof.

10. A filter unit as defined in claim 1 wherein the nipple-like means includes a throat which diverges at its orifice to thereby eliminate turbulent flow therethrough.

11. A filter unit comprising a tube having a plurality of inlet ports on the periphery thereof, a plurality of washer-like elements in registered face-to-face contact located within said tube to form a tubular member having radially extending pores between said washer-like elements for permitting flow of fluid therethrough from outside said tubular member to inside said tubular member, a plurality of axially extending ribs formed on and extending the full length of the internal surface of said tube for maintaining all of said washer-like elements in proper alignment, a nipple-like ferrule operatively connected to one end of said tube, said ferrule having a conical surface formed thereon for abutting one end of said tubular member, retaining means located at the other end of said tube, a movable endplate located within said tube and having a conical surface formed thereon for abutting the other end of said tubular member, a collar located intermediate the ends of said tubular member and slidable on said ribs, said collar having opposed conical surfaces in contact with the adjacent washer-like elements for preventing angular misalignment of the adjacent portions of said tubular member and in conjunction with the conical surfaces of said ferrule and endplate for causing the outer edges of said washer-like elements to be compressed more tightly than the inner edges thereof, and a coil spring confined within said tube between said retaining means and said endplate for urging said endplate against said tubular member, said endplate having an elongated extension formed thereon for preventing cocking of said coil spring and for directing a substantially perpendicular load against said tubular member.

12. A filter unit as defined in claim 11 wherein the ferrule is composed of an elastomeric material capable of sealing against an adjacent surface and includes a throat which diverges at its outlet orifive to thereby eliminate turbulent flow therethrough.

References Cited in the file of this patent

UNITED STATES PATENTS

| | | |
|---|---|---|
| 1,793,583 | Bowden | Feb. 24, 1931 |
| 2,308,310 | Ruemelin | Jan. 12, 1943 |
| 2,550,070 | Brecque et al. | Apr. 24, 1951 |
| 2,810,482 | Kasten | Oct. 22, 1957 |
| 2,811,218 | Winslow | Oct. 29, 1957 |
| 2,932,398 | Korte | Apr. 12, 1960 |

FOREIGN PATENTS

| | | |
|---|---|---|
| 841,818 | Great Britain | July 20, 1960 |
| 987,457 | France | Dec. 30, 1943 |